United States Patent
Wang et al.

(10) Patent No.: US 10,657,424 B2
(45) Date of Patent: May 19, 2020

(54) TARGET DETECTION METHOD AND APPARATUS

(71) Applicant: SAMSUNG ELECTRONICS CO., LTD., Suwon-si (KR)

(72) Inventors: Biao Wang, Beijing (CN); Chao Zhang, Beijing (CN); Changkyu Choi, Seongnam-si (KR); Deheng Qian, Beijing (CN); Jae-Joon Han, Seoul (KR); Jingtao Xu, Beijing (CN); Hao Feng, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 246 days.

(21) Appl. No.: 15/825,951

(22) Filed: Nov. 29, 2017

(65) Prior Publication Data

US 2018/0157938 A1    Jun. 7, 2018

(30) Foreign Application Priority Data

Dec. 7, 2016 (CN) .......................... 2016 1 1118373
Aug. 16, 2017 (KR) .......................... 10-2017-0103609

(51) Int. Cl.
*G06K 9/66* (2006.01)
*G06N 3/04* (2006.01)
*G06K 9/42* (2006.01)
*G06N 3/08* (2006.01)
*G06K 9/62* (2006.01)

(52) U.S. Cl.
CPC ............... *G06K 9/66* (2013.01); *G06K 9/42* (2013.01); *G06K 9/6282* (2013.01); *G06N 3/04* (2013.01); *G06N 3/0445* (2013.01); *G06N 3/0454* (2013.01); *G06N 3/0472* (2013.01); *G06N 3/08* (2013.01); *G06N 3/084* (2013.01)

(58) Field of Classification Search
CPC .. G06K 9/66; G06K 9/00288; G06K 9/00268; G06K 9/00221; G06K 9/00281
See application file for complete search history.

(56) References Cited

U.S. PATENT DOCUMENTS

| 7,577,297 B2 * | 8/2009 | Mori ................... G06K 9/00 375/E7.084 |
| 7,620,265 B1 * | 11/2009 | Wolff .................. G06T 5/50 382/254 |
| 7,912,253 B2 * | 3/2011 | Suzuki .............. G06K 9/00275 382/118 |
| 8,625,858 B2 * | 1/2014 | Torii ................. G06K 9/00234 382/118 |
| 8,832,004 B2 | 9/2014 | Kato et al. |

(Continued)

FOREIGN PATENT DOCUMENTS

| JP | 4532915 B2 | 8/2010 |
| KR | 10-2016-0069834 A | 6/2016 |

*Primary Examiner* — Yosef Kassa
(74) *Attorney, Agent, or Firm* — NSIP Law

(57) ABSTRACT

A method of detecting a target includes generating an image pyramid based on an image on which a detection is to be performed; classifying candidate areas in the image pyramid using a cascade neural network; and determining a target area corresponding to a target included in the image based on the plurality of candidate areas, wherein the cascade neural network includes a plurality of neural networks, and at least one neural network among the neural networks includes parallel sub-neural networks.

15 Claims, 11 Drawing Sheets

(56) References Cited

U.S. PATENT DOCUMENTS

| | | | |
|---|---|---|---|
| 8,861,881 B2* | 10/2014 | Tate | G06T 5/003 |
| | | | 345/473 |
| 9,117,111 B2* | 8/2015 | Mori | G06K 9/00281 |
| 9,202,144 B2 | 12/2015 | Wang et al. | |
| 2014/0236577 A1 | 8/2014 | Malon et al. | |
| 2015/0331832 A1 | 11/2015 | Minoya et al. | |

* cited by examiner

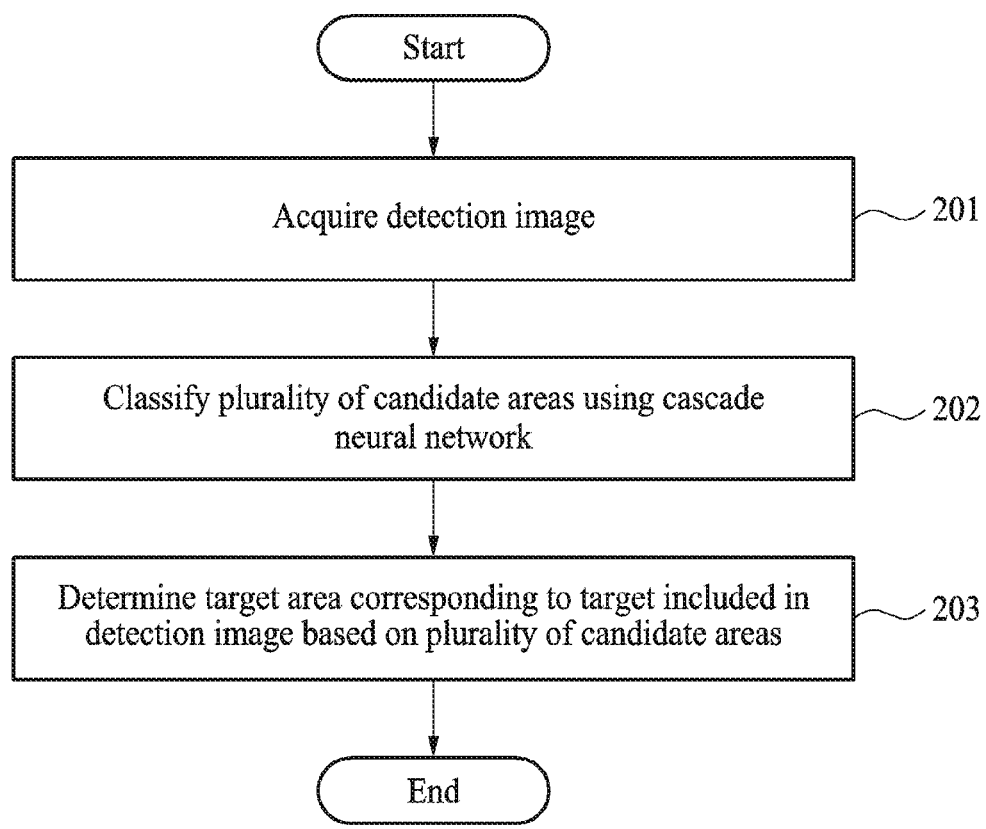

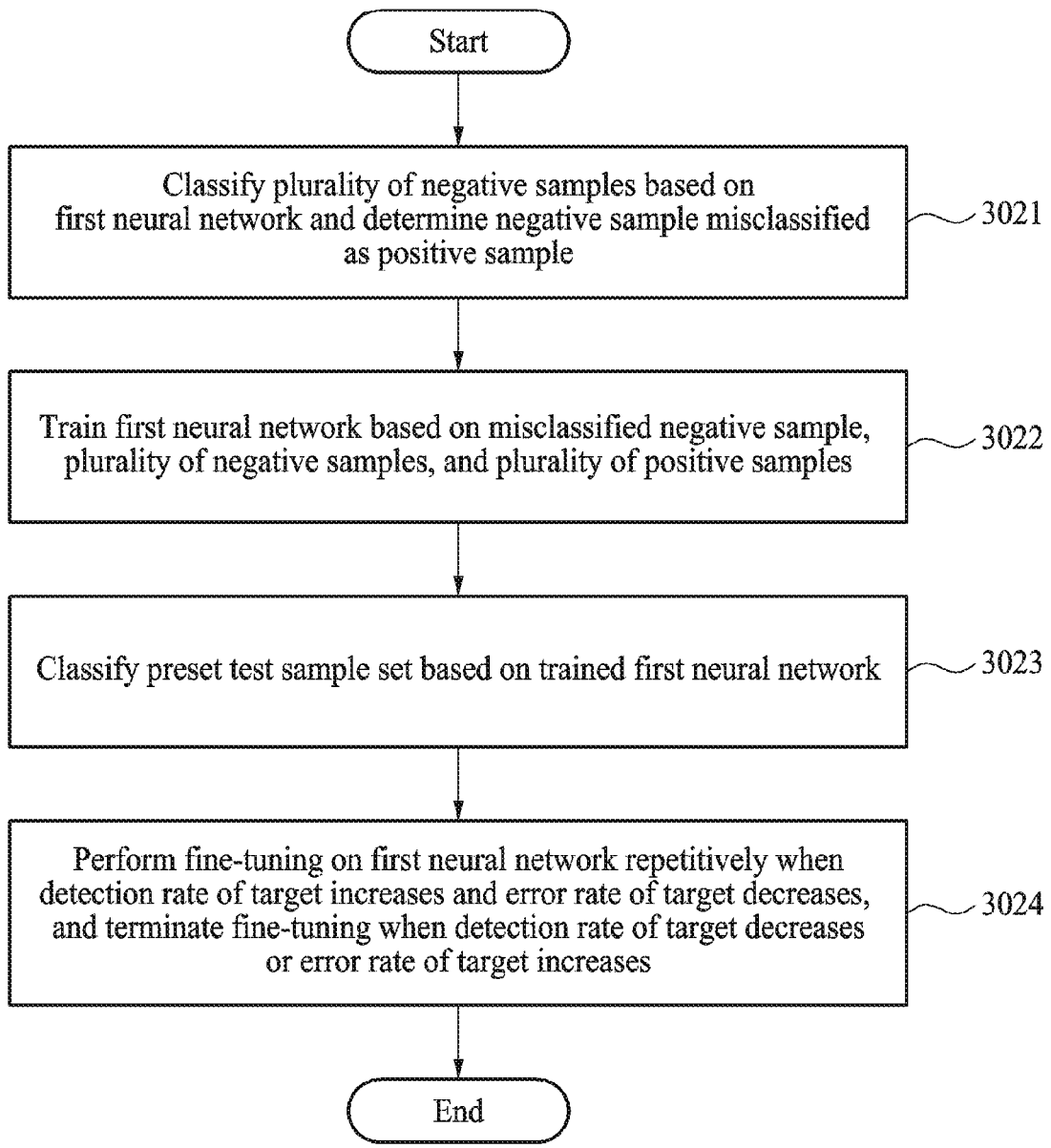

TARGET DETECTION METHOD AND APPARATUS

CROSS-REFERENCE TO RELATED APPLICATIONS

This application claims the benefit under 35 USC § 119(a) of Chinese Patent Application No. 201611118373.4 filed on Dec. 7, 2016 in the State Intellectual Property Office of the People's Republic of China and Korean Patent Application No. 10-2017-0103609 filed on Aug. 16, 2017 in the Korean Intellectual Property Office, the entire disclosures of which are incorporated herein by reference for all purposes.

BACKGROUND

1. Field

The following description relates to computer visual technology, and more particularly, to target detection method and apparatus.

2. Description of Related Art

Target detection is a traditional field for research on computer visual technology. In related arts, a variety of applications have been conducted on a target detection method, for example, using a combination of Haar features or local binary patterns (LBP) features with an adaptive boosting (AdaBoost) algorithm. However, it is difficult to significantly improve performances such as a detection rate using the target detection method.

An existing target detection algorithm has an issue that it is difficult to improve the performance including the detection rate because a target is vulnerable to interference. For example, when the target is a face, the face may be affected by a face posture, a skin color, dirt, debris on the lens, illumination, occlusion, blurriness, and other external factors. Thus, when the face is detected using an existing target detection method, the detection rate may be relatively low.

Recently, a depth-learning based target detection method has been developed, and the method substantially improves detection rate and error rate. However, the depth-learning based target detection method has issues including that a speed is relatively low and a quantity of classification model is relatively large.

A target classification model obtained through the depth learning may use a large amount of storage. In general, a quantity of data of a Zeiler and Fergus (ZF) classification model may be about 200 megabyte (MB), and a quantity of data of Visual Geometry Group (VGG) may be about 500 MB. As such, the target classification model may use a large amount of storage in a non-volatile memory, for example, hardware or flash memory, and also use a large amount of memory to classify model operations.

The amount of data of enormous classification models may reduce a calculation speed and a loading speed, and use a large amount of processor resources. For this, a use of the depth-learning based target detection method is restricted. Such obstacles may occur in equipment in which hardware specifications are relatively low or a calculation performance is relatively low. Also, an operation of the depth-learning based target detection method may require a further support of a central processing unit (CPU). Thus, it is difficult to use the depth-learning based target detection method, especially in performance-restricted equipments such as smart watches, headsets, and embedded systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a method of detecting a target, the method includes generating an image pyramid based on an image on which a detection is to be performed; classifying a plurality of candidate areas in the image pyramid using a cascade neural network; and determining a target area corresponding to a target included in the image based on the plurality of candidate areas, wherein the cascade neural network comprises a plurality of neural networks, and at least one neural network among the plurality of neural networks comprises a plurality of parallel sub-neural networks.

The classifying may include classifying a plurality of areas in the image using a first neural network; and classifying the plurality of areas into a plurality of target candidate areas and a plurality of non-target candidate areas using a second neural network including the plurality of parallel sub-neural networks, and wherein the plurality of neural networks includes the first neural network and the second neural network.

Each of the plurality of parallel sub-neural networks may correspond to a different target attribute.

In response to the target included in the image being a human face, the target attribute may include any one or any combination of two or more of a front face posture, a side face posture, a front face or a side face by rotation, a skin color, a light condition, an occlusion, and a clarity.

The determining may include normalizing positions and sizes of the plurality of target candidate areas based on layer images of the image pyramid comprising the plurality of target candidate areas and a difference in size and position between the layer images; and acquiring the target area by merging a plurality of normalized target candidate areas.

The plurality of neural networks may include a convolutional neural network and a Boltzmann network.

In another general aspect, a target detection training method includes receiving an image comprising a target; and training a cascade neural network comprising a plurality of neural networks using the image, wherein at least one neural network among the plurality of neural networks includes a plurality of parallel sub-neural networks.

The training may include classifying a sample set comprising a plurality of image areas into a plurality of positive samples and a plurality of negative samples based on a size of a target area corresponding to the target; training a first neural network based on the plurality of negative samples; and training a second neural network including the plurality of parallel sub-neural networks based on a misclassified sample, the plurality of negative samples, and the plurality of positive samples, and wherein the plurality of neural networks may include the first neural network and the second neural network.

The training may further include performing a fine-tuning on at least one of the first neural network and the second neural network repetitively until a detection rate of the target decreases or an error rate of the target increases, and wherein the performing of the fine-tuning may include training at least one of the first neural network and the second neural network based on the misclassified sample, the plurality of negative samples, and the plurality of positive samples; and classifying a test sample set through the training.

In another general aspect, an apparatus for detecting a target includes an image acquirer configured to generate an image pyramid based on an image on which a detection is to be performed; a candidate area classifier configured to classify a plurality of candidate areas in the image pyramid using a cascade neural network; and a target area determiner configured to determine a target area corresponding to a target included in the image based on the plurality of candidate areas, wherein the cascade neural network comprises a plurality of neural networks, and at least one neural network among the plurality of neural networks comprises a plurality of parallel sub-neural networks.

The candidate area classifier may include a first classifier configured to classify a plurality of areas in the image using a first neural network; and a second classifier configured to classify the plurality of areas into a plurality of target candidate areas and a plurality of non-target candidate areas using a second neural network comprising the plurality of parallel sub-neural networks, and wherein the plurality of neural networks comprises the first neural network and the second neural network.

Each of the plurality of parallel sub-neural networks may correspond to a different target attribute.

In response to the target included in the image being a human face, the target attribute may include any one or any combination of two or more of a front face posture, a side face posture, a front face or a side face by rotation, a skin color, a light condition, an occlusion, and a clarity.

The target area classifier may be configured to normalize positions and sizes of the plurality of target candidate areas based on layer images of the image pyramid including the plurality of target candidate areas and a difference in size and position between the layer images, and acquire the target area by merging a plurality of normalized target candidate areas.

The plurality of neural networks may include a convolutional neural network and a Boltzmann network.

A non-transitory computer readable storage medium may store instructions that when actuated by a processor, cause the processor to perform the method.

The method may further include actuating a camera to capture the image on which the detection is to be performed; and actuating a processor to generate the image pyramid, classify the plurality of candidate areas; and determine the target area.

The method may further include actuating a camera to capture the image comprising the target; and actuating a processor to train the cascade neural network.

The method may further include recognizing a human face in the image including the target.

Other features and aspects will be apparent from the following detailed description, the drawings, and the claims.

BRIEF DESCRIPTION OF THE DRAWINGS

FIG. 2 illustrates an example of an operation of a target detection apparatus, such as the one illustrated in FIG. 1.

FIG. 3C illustrates an example of an operation of a fine-tuning of a training, such as the one illustrated in FIG. 3B.

Throughout the drawings and the detailed description, the same reference numerals refer to the same or like elements. The drawings may not be to scale, and the relative size, proportions, and depiction of elements in the drawings may be exaggerated for clarity, illustration, and convenience

DETAILED DESCRIPTION

Figure 1:
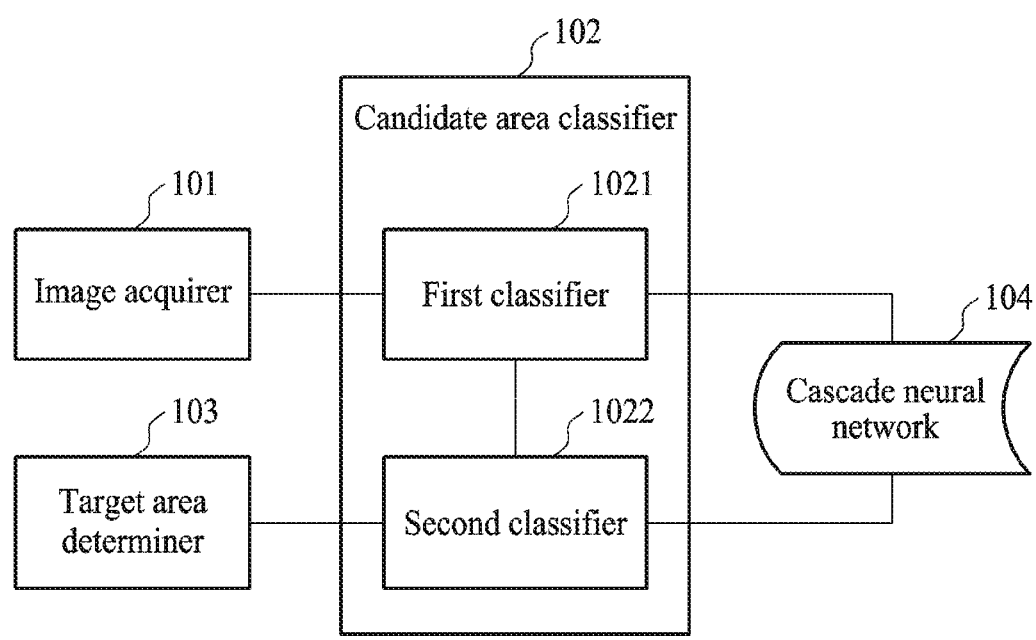
FIG. 1 illustrates an example of a target detection apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 is a block diagram illustrating an embodiment of a target detection apparatus 10 and FIG. 2 is a flowchart illustrating an example of an operation of the target detection apparatus 10 of FIG. 1.

Referring to FIGS. 1 and 2, a target detection apparatus 10 detects a target using a cascade classifier combined with a depth-learning model referred to as a cascade convolutional neural network (CNN) to address an issue related to a size of a classification model used in a depth-learning based target detection method.

In a related art, a cascade CNN-based target detection method uses a CNN corresponding to 6 levels as a classification model. Thus, the classification model uses a relatively large amount of storage, which may reduce a calculation speed and require a relatively great amount of resources, more than may be available in some targeted devices. On the other hand, an existing cascade CNN has levels of CNNs, each being a small size CNN and a quantity of data acceptable by the small size CNN is relatively small.

When a target is a face, the cascade CNN-based target detection method may not accurately represent attribute information including a face posture, a skin color, and a light condition. Thus, a performance such as a target detection rate may not be improved as compared with an existing adaptive boosting (AdaBoost) algorithm.

The target detection apparatus 10 may solve or help address an issue of a large amount of storage used by a classification model and a low detection rate in the existing cascade CNN.

The target detection apparatus 10 generates an image pyramid based on an image on which detection is to be performed, and classifies a plurality of candidate areas in the image pyramid. Hereinafter, the image on which a detection is to be performed is also referred to as, for example, a detection image. The target detection apparatus 10 detects a target from the detection image by determining a target area corresponding to the target in the detection image.

The target may include at least one of a part of a living body and an environmental object. The part of the living body may be, for example, a human face, an animal face, a fruit, a flower, or a leaf of a plant. The environmental object may include, for example, a traffic sign or a signal.

The target detection apparatus 10 classifies the candidate areas of the detection image using a neural network, thereby improving a classification accuracy. The target detection apparatus 10 simultaneously classifies images captured at a plurality of angles and completely and accurately performs classification on the detection image. The target detection apparatus 10 accurately determines a target area based on an accurate classification result.

The target detection apparatus 10 reduces a number of neural networks overall using a plurality of sub-neural networks included in the neural network, increases a calculation speed, and significantly reduces an amount of storage used by a classification model including a plurality of neural networks. The target detection apparatus 10 is particularly beneficial in application to low-specification hardware or low-performance equipment such as reduced-size, reduced power devices such as smart watches, phones, headsets, and other such devices.

The target detection apparatus 10 includes an image acquirer 101, a candidate area classifier 102, a target area determiner 103, and a cascade neural network 104.

In operation 201, the image acquirer 101 acquires a detection image. The image acquirer 101 generates an image pyramid based on the detection image. An operation of generating an image pyramid is described further with reference to FIGS. 7 and 8.

The image acquirer 101 acquires the detection image using a capturing device in a terminal. The capturing device may include, for example, any one or any combination of two or more of an infrared, ultraviolet, or visible camera, an image scanning device, either coupled directly in to the terminal or disposed remotely therefrom.

A terminal or a terminal device may include a wireless signal receiver and a transmitting and receiving hardware device. The terminal or the terminal device may indicate a device that is capable of bidirectional transmission and reception. The terminal device may include a communication device such as Honeycomb, or other suitable communications interface such as WiFi, Bluetooth, ZIGBEE, in a hierarchical or low power mesh-type topology. The terminal device may include a single circuit display, a multiple circuit display, and a Honeycomb device not including the multiple circuit display.

The terminal may be, for example, a personal communications service (PCS), a personal digital assistant (PDA), a radio frequency (RF) receiver, a pager, an Internet network, an Internet browser, a note pad, a calendar, a global positioning system (GPS) receiver, a laptop computer, a handheld computer, a mobile internet device (MID), a mobile phone, a smart TV, and a set-top box, which is capable of voice and data processing, faxing, and/or data communication.

Also, the terminal may be portably carried, and may be installed and/or disposed on a transport device in, for example, an aircraft or a ship.

In operation 202, the candidate area classifier 102 classifies a plurality of candidate areas using the cascade neural network 104.

A candidate area may be a predetermined area included in a detection image. The candidate area may also be a result obtained by performing an image processing on a portion of the detection image.

The candidate area classifier 102 includes a first classifier 1021 and a second classifier 1022.

The first classifier 1021 and the second classifier 1022 classifies the candidate areas using the cascade neural network 104.

In operation 203, the target area determiner 103 determines a target area corresponding to a target included in the detection image based on the plurality of candidate areas.

The target area indicates an area including a target in a detection image.

The cascade neural network 104 includes a plurality of neural networks. Among the plurality of neural networks, at least one neural network includes a plurality of parallel sub-neural networks. Also, the plurality of neural networks includes a convolutional neural network and a Boltzmann network.

Each of the plurality of parallel sub-neural networks corresponds to a different target attribute. The target attribute indicates a unique trait of a target.

When the target is a human face, the target attribute includes any one or any combination of a front face posture, a side face posture, a front face or side face by rotation, a skin color, a light condition, an occlusion, and a clarity.

The skin color may include, for example, a light complexion, a dark complexion, and a neutral-tone complexion. The light condition may include a backlight, a low light, and a normal light other than the backlight and the low light. The clarity may include a clearness and a blurriness.

Also, any one of the sub-neural networks may correspond to a target attribute including, for example, the front face posture, the neutral-tone complexion, a backlight, and a blurriness.

The cascade neural network 104 includes at least two neural networks. Each of the neural networks classifies the candidate areas in the detection image.

The cascade neural network 104 may be implemented as a 2-stage model in a form of a tree arch. An operation of the 2-stage model is described further with reference to FIG. 9.

When the cascade neural network 104 includes two neural networks, the two neural networks are a first neural network and a second neural network. The second neural network classifies a classification result of the first neural network.

At least one of the first neural network and the second neural network includes a plurality of parallel sub-neural networks.

When the second neural network includes the plurality of parallel sub-neural networks, and when the human face is a target, the second neural network includes a sub-neural network corresponding to the front face posture, a sub-neural network corresponding to the side face posture, sub-neural networks corresponding to different skin colors, and a sub-neural network corresponding to a backlight.

A plurality of sub-neural networks may be independent on one another and in a parallel relationship. For example, the plurality of sub-neural networks may be used at the same time or at different times.

The first classifier 1021 classifies a plurality of areas in a detection image using the first neural network. The second classifier 1022 classifies the plurality of areas into a plurality of target candidate areas and a plurality of non-target candidate areas using the second neural network including the plurality of parallel sub-neural networks.

The cascade neural network 104 includes a plurality of neural networks, for example, three or four neural networks. At least one of the neural networks includes the plurality of parallel sub-neural networks.

In one example, the first neural network includes a single sub-neural network, the second neural network includes a plurality of parallel sub-neural networks, a third neural network includes a single sub-neural network, and a fourth neural network includes a plurality of parallel sub-neural networks.

In this example, at least one of the parallel sub-neural networks in the second neural network classifies a classification result of the first neural network.

In another example, when the cascade neural network 104 includes three neural networks, the first neural network includes a single sub-neural network, the second neural network includes a plurality of parallel sub-neural networks, and the third neural network includes a plurality of parallel sub-neural networks.

In this example, at least one of the parallel sub-neural networks in the second neural network classifies a classification result of the first neural network. Also, at least one of the parallel sub-neural networks in the third neural network classifies a classification result of the parallel sub-neural networks in the second neural network.

When a last neural network is classified, the plurality of target candidate areas and the plurality of non-target areas are acquired, and then a candidate area is determined.

Hereinafter, an operation of training a cascade neural network will be described with reference to FIGS. 3A, 3B, and 3C.

Figure 3A:
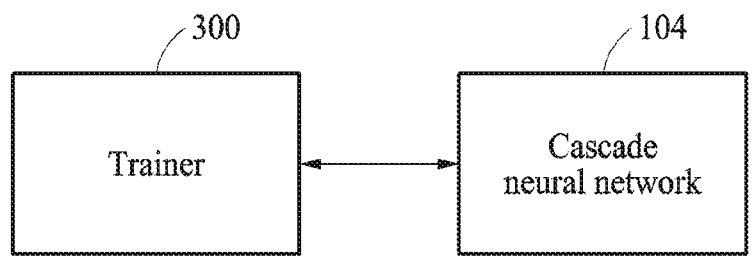
FIG. 3A illustrates an example of a training apparatus.
Figure 3B:
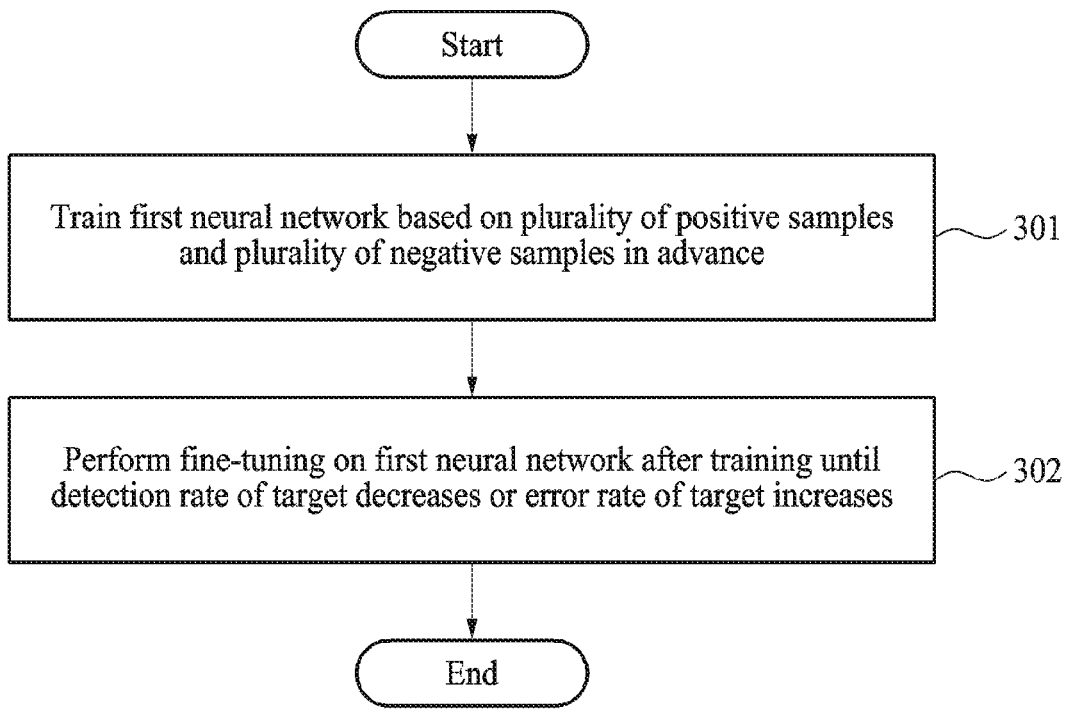
FIG. 3B illustrates an example of an operation of training a first neural network included in a cascade neural network, such as the one of FIG. 1.

FIG. 3A is a block diagram illustrating a training apparatus 20, and FIG. 3B is a flowchart illustrating an example of an operation of training a first neural network included in the cascade neural network 104 of FIG. 1.

Referring to FIG. 3A, the training apparatus 20 includes a trainer 300 and a cascade neural network, for example, the cascade neural network 104.

In operation 301, the trainer 300 trains the first neural network based on a plurality of positive samples and a plurality of negative samples in advance.

A positive sample may be an image area in which a size of a target area reaches a threshold value in a sample set including a plurality of image areas that have been known. Also, a positive sample may be an image area in which a size of a target area is less than the threshold value.

When a size of a target area reaches 30% of an image area including the target area, the trainer 300 determines the image area to be the positive sample. When a size of a target area is less than 30% of an image area including the target area, the trainer 300 determines the image area to be the negative sample.

When a human face is a target, the trainer 300 determines an image area having a target attribute, for example, a plurality of postures including a front face, a side face, and a rotated face, a plurality of skin colors, and a plurality of light conditions, to be the positive sample. The trainer 300 determines an image area not including a face of various background images and another image area to be the negative sample.

The trainer 300 generates a first neural network and initializes a parameter of the first neural network.

The trainer 300 previously trains the first neural network generated based on a predetermined number of negative samples randomly extracted from a set of the plurality of positive samples and a set of the plurality of negative samples. The trainer 300 determines a network parameter of the first neural network through a previous training. A method used by the trainer 300 to train the first neural network may be a backpropagation algorithm.

In operation 302, the trainer 300 repetitively performs fine-tuning on the first neural network after the training. The trainer 300 repetitively performs on the first neural network the fine-tuning until a detection rate of the target decreases or an error rate of the target increases.

The trainer 300 determines a first neural network on which a fine-tuning is performed immediately before the last fine-tuning, to be a final trained neural network.

In this example, a case in which the detection rate of the target decreases or the error rate of the target increases may include a case in which the detection rate decreases and the error rate decreases, a case in which the detection rate increases and the error rate increases, and a case in which the detection rate decreases and the error rate increases.

FIG. 3C is a flowchart illustrating an example of an operation of fine-tuning of FIG. 3B.

Referring to FIG. 3C, in operation 3021, the trainer 300 classifies a plurality of negative samples based on a first neural network and determines a negative sample that is misclassified as a positive sample.

In this example, the first neural network used by the trainer 300 may include a pre-trained first neural network and a fine-tuned neural network.

The trainer 300 classifies samples into two types, a positive sample and a negative sample of a negative sample set based on the first neural network, and determines a negative sample misclassified as the positive sample among the classified samples.

For example, the trainer 300 classifies all negative samples of a negative sample set into the positive sample and the negative sample and determines a negative sample misclassified as the positive sample among the classified negative samples.

In operation 3022, the trainer 300 trains the first neural network based on the misclassified negative sample, a plurality of negative samples, and a plurality of positive samples.

The trainer 300 mixes the misclassified negative sample and a predetermined number of negative samples extracted from the negative sample set. The negative samples may be extracted based on, for example, a psuedo-random approach or any other suitable extraction paradigm.

The trainer 300 acquires a network parameter by training the first neural network based on the mixed negative samples and the plurality of positive samples, thereby training the first neural network. In this example, the trainer 300 may use a backpropagation algorithm to determine the first neural network.

In operation 3023, the trainer 300 classifies a preset test sample set based on the trained first neural network. The test sample set may be a set of samples aware of a classification result.

The trainer 300 classifies a plurality samples included in the test sample set into the positive sample and the negative sample. For example, when a target is a human face, the trainer 300 classifies a plurality of samples of a face detection data set and benchmark (FDDB) set into a face area and a non-face area based on the first neural network. In this example, a preset test sample corresponds to an FFDB, the face area corresponds to the positive sample, and the non-face area corresponds to the negative sample.

In operation 3024, the trainer 300 repetitively performs fine-tuning on the first neural network when a detection rate of a target increases and an error rate of the target decreases, and terminates the fine-tuning when the detection rate of the target decreases or the error rate of the target increases.

In this example, the trainer 300 compares a classification result obtained through the repetitive fine-tuning to samples aware of the classification result in the test sample set and determines the detection rate and the error rate of the target of the first neural network.

The error rate may be a ratio of a negative sample misclassified as the positive sample and a positive sample misclassified as the negative sample to all samples. The detection rate may be a ratio of positive samples detected from a sample set to all positive samples in the sample set.

The trainer 300 compares a detection rate and an error rate for a target of the first neural network after the fine-tuning to a detection rate and an error rate for the target before the fine-tuning. As a comparison result, when the detection rate increases and the error rate decreases after the fine-tuning, the first neural network may be possible to be improved in performance and thus, the trainer 300 performs the fine-tuning again.

As a comparison result, when the detection rate decreases and the error rate increases after the fine-tuning, the trainer 300 determines that the performance of the first neural network is maximized and thus, terminates the fine-tuning.

Figure 4:
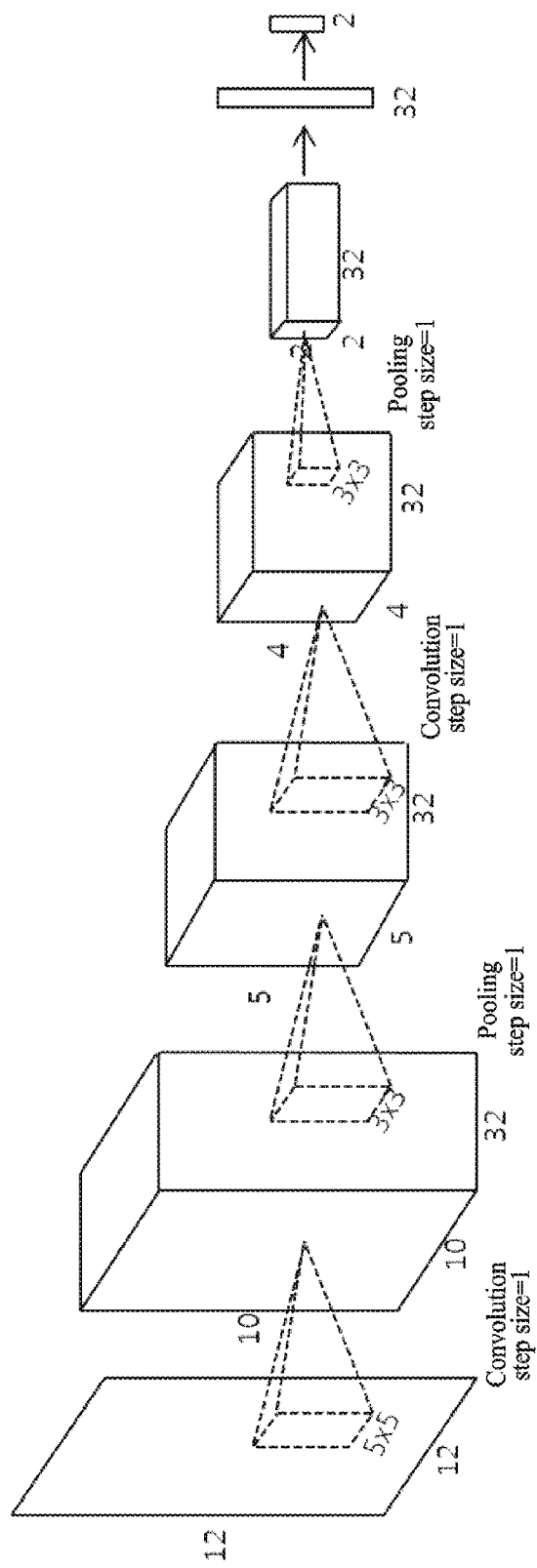
FIG. 4 illustrates an example of a first neural network, such as the one of FIG. 3B

FIG. 4 illustrates an example of a structure of the first neural network of FIG. 3B.

Referring to FIG. 4, an example of a first neural network includes a plurality of networks. The first neural network includes, according to embodiment, an input layer, five hidden layers, and an output layer, starting from left. The five hidden layers include a first convolutional layer or a first filter layer, a first pooling layer, a second convolutional layer, a second pooling layer, and a full join layer, starting from the left.

The input layer is represented, for example, as a 12×12 neuron matrix having a height of 12 and a depth of 12. The input image corresponds to a 12×12 pixel point matrix.

The first convolutional layer is represented as a rectangle having a height of 10, a depth of 10, and a width of 32. The trainer 300 performs convolution on the input image to express the input image as 32 characteristic maps.

A convolution step size between the input layer and the first convolutional layer may be a convolution step size of the first convolutional layer. The first convolutional layer includes 32 first convolutional kernels or filters. Each kernel corresponds to a characteristic map and each convolutional kernel includes a 5×5 neuron matrix.

Each convolutional kernel scans a template based on the 5×5 neuron matrix as a unit matrix. Also, each convolutional kernel scans the template at an interval of a convolution step pixel to scan pixels corresponding to a neuron of the input layer. In the example of FIG. 4, when a convolution step size is 1, the convolution step pixel is one pixel.

In a process of scanning, each convolutional kernel performs the convolution on an input layer corresponding to a convolution step interval with respect to a plurality of sets, each including 5×5 pixel points. The trainer 300 maps a pixel point corresponding to a plurality of 5×5 neuron areas having the convolution step size as an interval in the input layer, to a pixel point of one characteristic map among a first convolution result.

The first pooling layer is represented as a rectangle having a height of 5, a depth of 5, and a width of 32. In the first pooling layer, 32 characteristic maps are formed by performing a first pooling on the 32 characteristic maps generated in the first convolutional layer as a first convolution result. In this example, each of the characteristic maps includes 5×5 pixel points.

A pooling step size between the first convolutional layer and the first pooling layer may be a pooling step size of the first pooling layer. The first pooling layer includes 32 first pooling kernels and 32 characteristic maps. Each of the pooling kernels includes a 3×3 neuron matrix.

The trainer 300 scans a template in units of the 3×3 neuron matrix using each of the pooling kernels and scans a characteristic map of the first convolutional layer at an interval of a pooling step size pixel. In this example, when a pooling step size is 1, the pooling step size pixel is one pixel.

In a process of scanning, the trainer 300 performs pooling on a plurality of sets, each including 3×3 pixel points having the pooling step size as an interval in a first convolution characteristic map and acquires a characteristic map based on a result of the pooling.

The trainer 300 maps the feature maps of the first convolutional layer to the characteristic map of the first pooling layer corresponding to the plurality of sets at an interval of the pooling step size.

The second convolutional layer is represented as a rectangle having a height of 4, a depth of 4, and a width of 32. After the 32 characteristic maps of the first pooling map pass through the second convolutional layer, the trainer 300 acquires 32 characteristic maps of the second convolutional layer. Each of the characteristic maps includes 4×4 pixel points.

The second pooling layer is represented as a rectangle having a height of 2, a depth of 2, and a width of 32. The trainer 300 performs a second pooling on the 32 characteristic maps of the second convolutional layer, thereby acquiring 32 characteristic maps of the second pooling layer. Each of the characteristic maps includes 2×2 pixel points.

The operations of the second convolution layer and the second pooling layer are performed identically to the operations of the first convolutional layer and the first pooling layer.

The full join layer includes 32 neurons. Each of the neurons of the full join layer is independently connected to each neuron of the second pooling layer.

The output layer includes two neurons. Each of the neurons of the output layer is independently connected to each of the neurons of the full join layer.

Figure 5A:
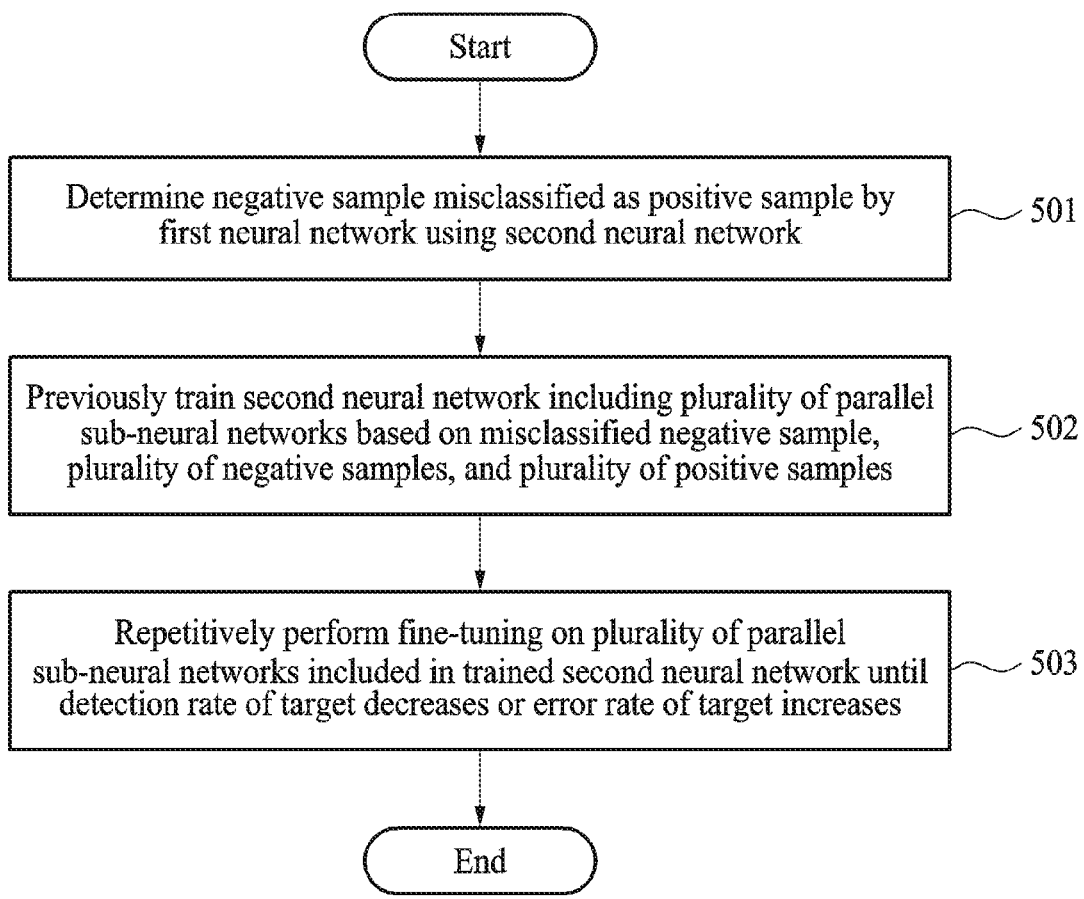
FIG. 5A illustrates an example of an operation of training a second neural network included, for example, in a cascade neural network, such as the one of FIG. 1.

FIG. 5A is a flowchart illustrating an operation of training a second neural network included in the cascade neural network 104 of FIG. 1.

Referring to FIG. 5A, in operation 501, the trainer 300 determines a negative sample misclassified as a positive sample by a first neural network using a second neural network.

In operation 502, the trainer 300 previously trains the second neural network including a plurality of parallel sub-neural networks based on the misclassified negative sample, a plurality of negative samples, and a plurality of positive samples.

The trainer 300 generates a plurality of sub-neural networks included in the second neural network and performs an initialization on parameters thereof. The initialization may be random, psuedo-random, or any other suitable measures for initialization may be employed. The trainer 300 mixes a negative sample misclassified as the positive sample and a predetermined number of negative samples extracted from a negative sample set. The extraction may be random, psuedo-random, or employ any other suitable measures for extracting negative samples.

The trainer 300 acquires a network parameter of the second neural network by training the plurality of parallel sub-neural networks included in the second neural network based on the plurality of positive samples and a plurality of mixed negative samples. Through this, the trainer 300 determines the plurality of parallel sub-neural networks included in the trained second neural network.

The trainer 300 performs a previous training using a backpropagation algorithm.

In operation 503, the trainer 300 repetitively performs the fine-tuning on the plurality of parallel sub-neural networks included in the trained second neural network until a detection rate of a target decreases or an error rate of the target increases.

When a detection rate of the plurality of parallel sub-neural networks included in the second neural network decreases or an error rate of the plurality of parallel sub-neural networks increases, the trainer 300 determines a plurality of sub-neural networks on which a fine-tuning is performed immediately before the last fine-tuning, to be final trained neural networks.

Figure 5B:
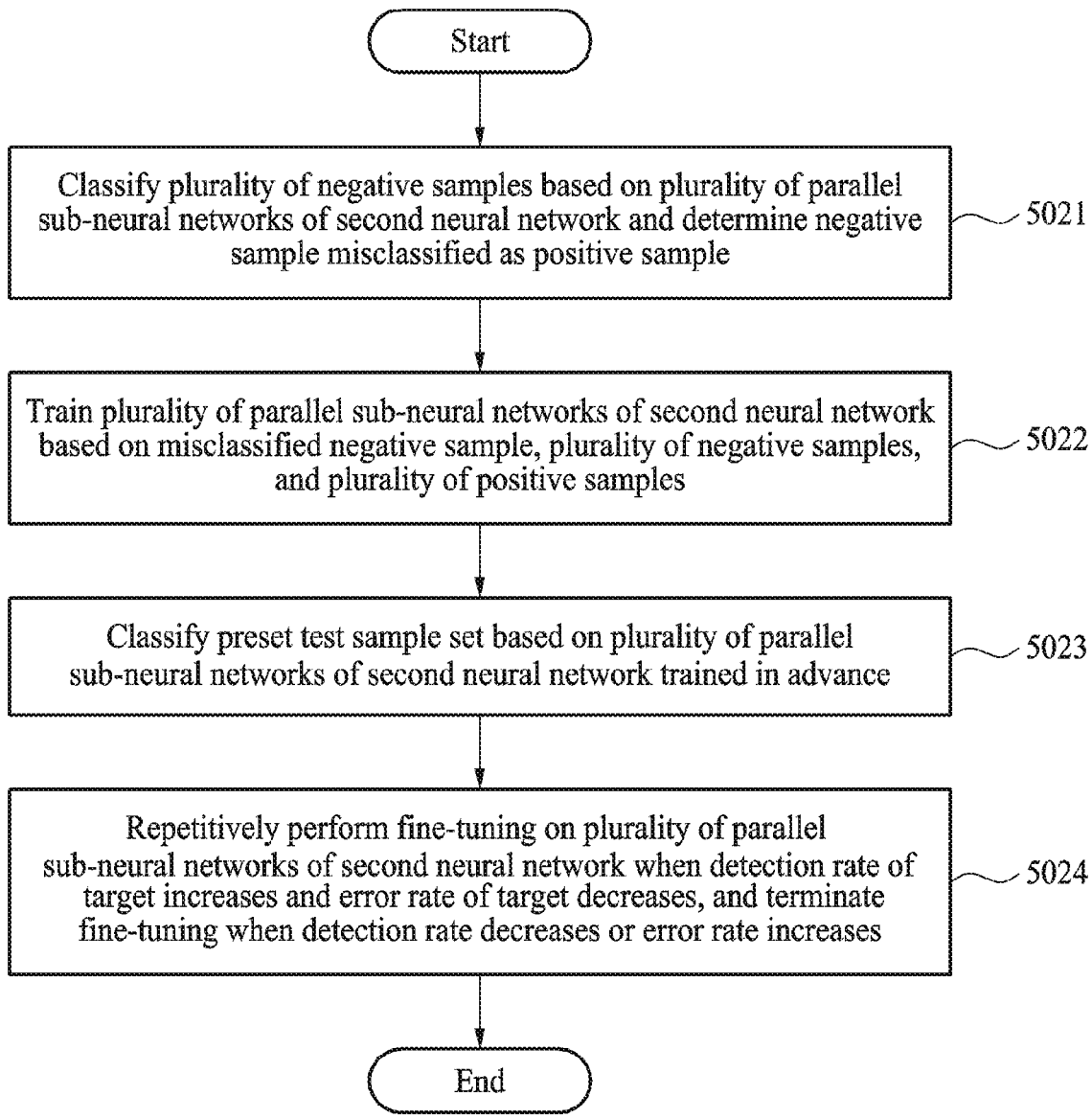
FIG. 5B illustrates an example of an operation of a fine-tuning of a training method, such as the one illustrated in FIG. 5A.

FIG. 5B is a flowchart illustrating an operation of fine-tuning performed in the example of FIG. 5A.

Referring to FIG. 5B, in operation 5021, the trainer 300 classifies a plurality of negative samples based on a plurality of parallel sub-neural networks of a second neural network and determines a negative sample misclassified as a positive sample.

The plurality of parallel sub-neural networks of the second neural network may be a pre-trained sub-neural network or a fine-tuned sub-neural network.

The trainer 300 classifies negative samples of a negative sample set based on the plurality of parallel sub-neural networks of the second neural network and determines the negative sample misclassified as the positive sample.

In operation 5022, the trainer 300 trains the plurality of parallel sub-neural networks of the second neural network based on the misclassified negative sample, a plurality of negative samples, and a plurality of positive samples.

The trainer 300 mixes the negative sample misclassified as the positive sample and a predetermined number of negative samples arbitrarily extracted from the negative sample set.

The trainer 300 trains a sub-neural network based on the plurality of mixed negative samples and the plurality of positive samples and acquires a network parameter, thereby determining the plurality of parallel sub-neural networks of the second neural network.

The trainer 300 trains the plurality of parallel sub-neural networks of the second neural network using a backpropagation algorithm.

In operation 5023, the trainer 300 classifies a preset test sample set based on the plurality of parallel sub-neural networks of the second neural network trained in advance.

The trainer 300 classifies a plurality of the test sample set into a plurality of positive samples and a plurality of negative samples based on the plurality of parallel sub-neural networks of the second neural network.

For example, the trainer 300 classifies a plurality of samples of an FDDB into a face area and a non-face area.

In operation 5024, the trainer 300 repetitively performs fine-tuning on the plurality of parallel sub-neural networks of the second neural network when a detection rate of a target increases and an error rate of the target decreases, and terminates the fine-tuning when the detection rate decreases or the error rate increases.

The trainer 300 compares a classification result obtained by repetitively performing the fine-tuning and a classification result of the test sample set aware of a classification result, and determines the detection rate of the target and the error rate of the target of the plurality of parallel sub-neural networks of the second neural network.

The trainer 300 compares a detection rate and an error rate after the fine-tuning to a detection rate and an error rate before the fine-tuning.

As a comparison result, when the detection rate increases and the error rate decreases with respect to the target of the plurality of parallel sub-neural networks after the fine-tuning, the trainer 300 determines that a performance of the plurality of parallel sub-neural networks of the second neural network is likely to be improved and thus, repetitively performs the fine-tuning.

As a comparison result, when the detection rate decreases and the error rate increases with respect to the target of the plurality of parallel sub-neural networks in the second neural network, the trainer 300 determines that a performance of the plurality of parallel sub-neural networks of the second neural network is maximized and thus, terminates the fine-tuning.

Figure 6:
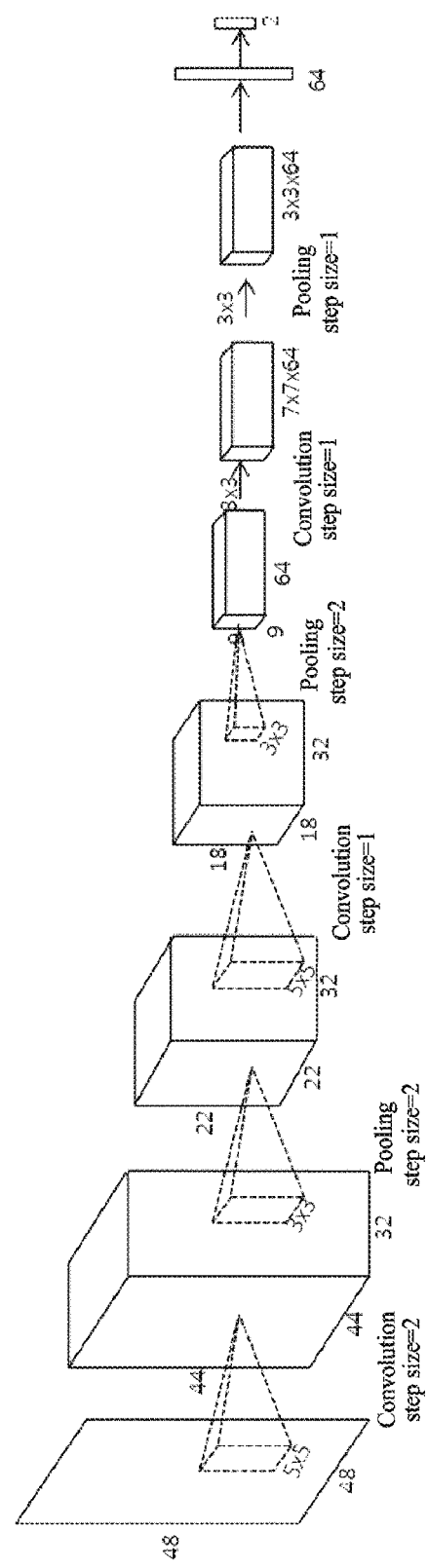
FIG. 6 illustrates an example of a sub-neural network included in a second neural network, such as the one of FIG. 5A.

FIG. 6 illustrates an example of a structure of a sub-neural network included in the second neural network of FIG. 5A.

FIG. 6 illustrates an input layer, seven hidden layers, and an output layer, starting from left. The hidden layer includes a first convolutional layer, a first pooling layer, a second convolutional layer, a second pooling layer, a third convolutional layer, a third pooling layer, and a full join layer, staring from the left.

The first convolutional layer is represented as a rectangle having a height of 44, a depth of 44, and a width of 32. The trainer 300 performs convolution on the input image to obtain 32 characteristic maps in the first convolutional layer. Each of the characteristic maps includes 44×44 pixel points.

A convolution step size between the input layer and the first convolutional layer may be a first convolution step size. The first convolutional layer includes 32 first convolutional kernels or filters. The 32 first convolutional kernels correspond to the 32 characteristic maps. A first convolutional kernel includes a 5×5 neuron matrix.

The trainer 300 scans a template in units of the 5×5 neuron matrix corresponding to each of the first convolutional kernels. Also, the trainer 300 scans the template at an interval of a convolution step size pixel to scan a pixel point corresponding to a neuron of the input layer. In this example, when a convolution step size is 2, the convolution step size pixel is two pixels.

In a process of scanning, the trainer 300 performs the convolution on a plurality of sets, each including 5×5 pixel points at an interval of the convolution step size corresponding to the input layer using each of the first convolutional kernels and acquires a characteristic map.

The trainer 300 maps a pixel point corresponding to a plurality of 5×5 neuron areas having the convolution step size as an interval in the input layer, to a plurality of pixel points of the characteristic map of the first convolutional layer.

The first pooling layer is represented as a rectangle having a height of 22, a depth of 22, and a width of 32. The trainer 300 performs pooling on the 32 characteristic maps of the first convolution layer to acquire 32 characteristic maps of the first pooling layer. Each of the characteristic maps includes 22×22 pixel points.

A step size between the first convolutional layer and the first pooling layer may be a pooling step size of the first pooling layer. The first pooling layer includes 32 first pooling kernels. The 32 first pooling kernels may correspond to 32 characteristic maps. Each of the first pooling kernels includes a 3×3 neuron matrix.

The trainer 300 scans a template in units of the 3×3 neuron matrix corresponding to each of the first pooling kernels. Also, the trainer 300 scans a pixel point of a characteristic map of the first convolutional layer at an interval of a pooling step size pixel. In this example, when the pooling step size is 2, the pooling step size pixel is two pixels.

The trainer 300 performs the pooling with a plurality of 3×3 pixel point sets having the pooling step size as an interval in the characteristic map of the first convolutional layer using each of the first pooling kernels, and acquires a characteristic map of the first pooling layer.

The trainer 300 performs the pooling on the plurality of 3×3 pixel point sets in the characteristic map of the first convolutional layer at an interval of the pooling step size such that the plurality of 3×3 pixel point sets correspond to a plurality of pixel point sets in the characteristic map of the first pooling layer.

The second pooling layer is represented as a rectangle having a height of 18, a depth of 18, and a width of 32. The trainer 300 performs the convolution on the 32 characteristic maps of the first pooling layer to acquire 32 characteristic maps of the second convolutional layer. A characteristic map of the second convolutional layer includes 18×18 pixel points.

The second pooling layer is represented as a rectangle having a height of 9, a depth of 9, and a width of 64. The trainer 300 performs the pooling on the 32 characteristic maps of the second convolutional layer to acquire 64 characteristic maps of the second pooling layer. Each of the characteristic maps of the second pooling layer includes 9×9 pixel points.

The third convolutional layer is represented as a rectangle having a height of 7, a depth of 7, and a width of 64. The trainer 300 performs the convolution on the 64 characteristic maps of the second pooling layer to acquire 64 characteristic maps of the third convolutional layer. Each of the characteristic maps of the third convolutional layer includes 7×7 pixel points.

The third pooling layer is represented as a rectangle having a height of 3, a depth of 3, and a width of 64. The trainer 300 performs the pooling on 64 characteristic maps of the third convolutional layer to acquire 64 characteristic maps of the third pooling layer. Each of the characteristic maps of the third pooling layer includes 3×3 pixel points.

The operations of the second convolution layer and the third convolutional layer are performed in substantially identical manner to the operation of the first convolutional layer, and the operations of the second pooling layer and the third pooling layer are performed in substantially identical manner to the operation of the first pooling layer.

The full join layer includes 64×64 neurons. Each of the neurons of the full join layer is independently connected to each neuron of the third pooling layer.

The output layer includes two neurons. Each of the neurons of the output layer are independently connected to each of the neurons of the full join layer.

Figure 7:
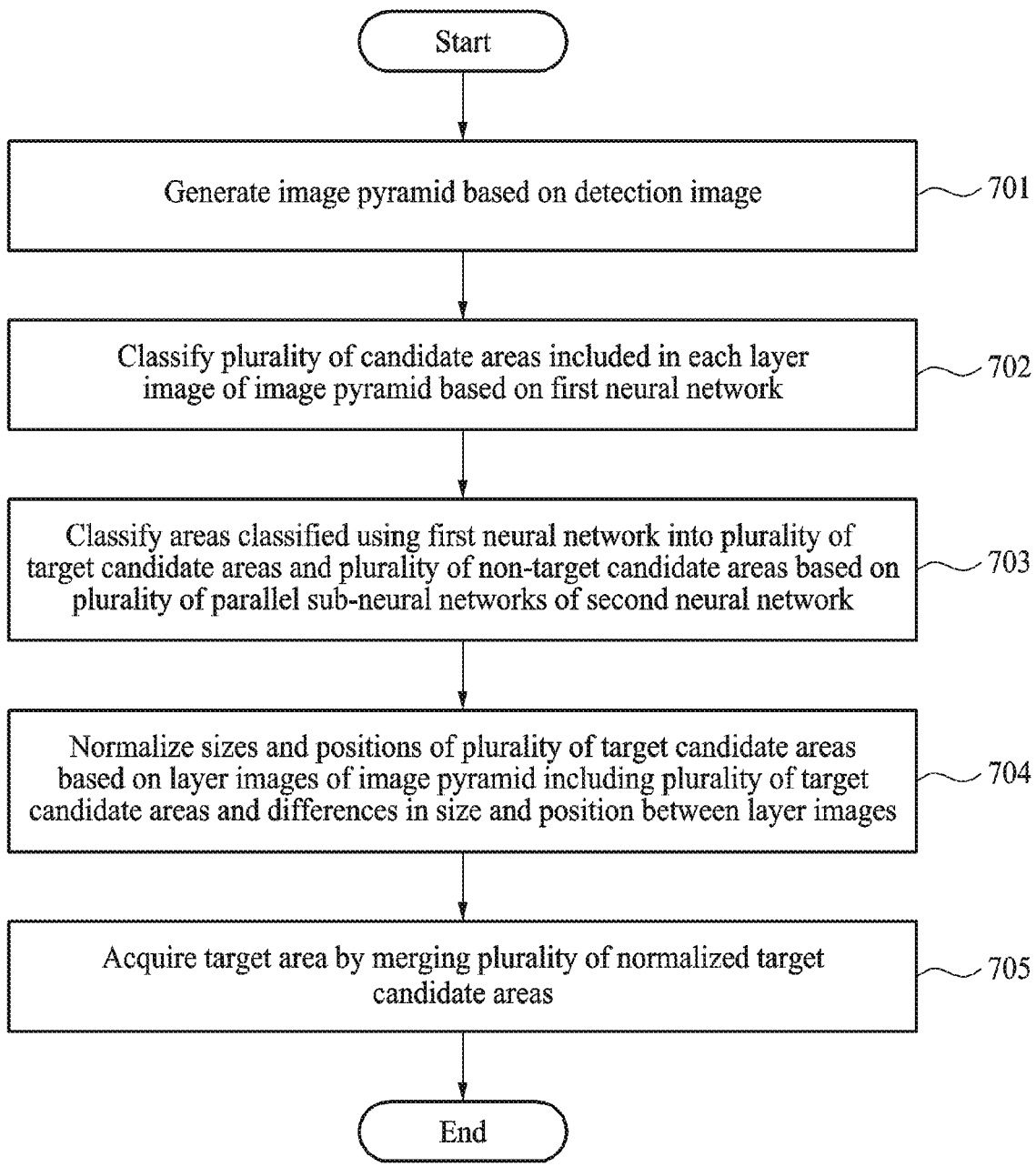
FIG. 7 illustrates an operation of generating an image pyramid and detecting a target using a target detection apparatus, such as the one illustrated in FIG. 1.
Figure 8:
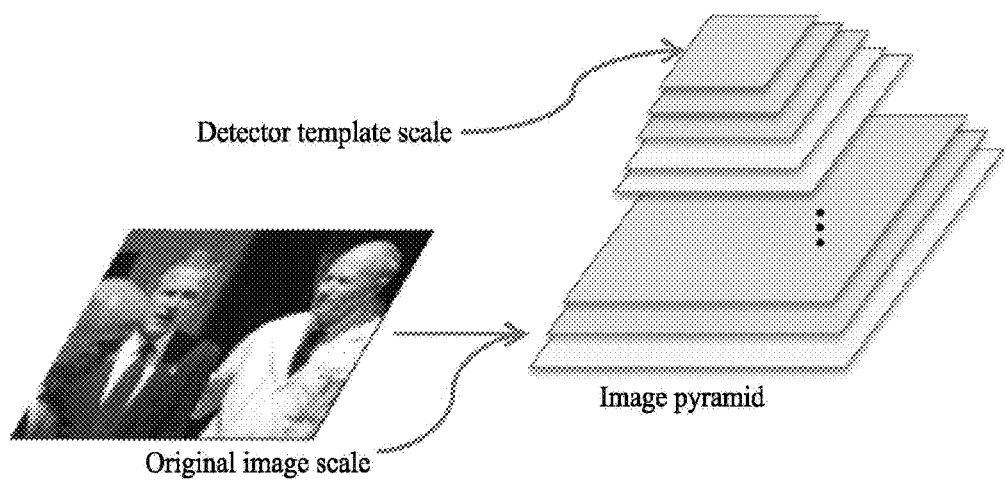
FIG. 8 illustrates an example of an image pyramid, such as the one generated in FIG. 7.

FIG. 7 is a flowchart illustrating an operation of detecting a target by generating an image pyramid using the target detection apparatus 10 of FIG. 1, and FIG. 8 illustrates an example of the image pyramid of FIG. 7.

Referring to FIGS. 7 and 8, in operation 701, the image acquirer 101 generates an image pyramid based on an image on which detection is to be performed, for example, a detection image.

The image acquirer 101 acquires the image. The detection image may include a single independent image or a frame of a video image.

The image acquirer 101 gradually reduces a size of the image based on a predetermined ratio until the size is reduced to reach a template size of the target detection apparatus 10.

A template of the target detection apparatus 10 may be an input layer of a first CNN network and may take the unit detection area. One neuron of the template corresponds to one pixel of the image. When the template and the image have a shape of rectangle, a size of each of the template and the image may be indicated by a length and a width.

The image acquirer 101 determines a reduction ratio based on any one or any combination of two or more of experimental data, history data, experience data, and/or an actual situation. For example, the image acquirer 101 sets the reduction ratio to 1.2 times, and repetitively reduces the size of the image by 1.2 times until the size of the image reaches the template size of the target detection apparatus 10.

The image acquirer 101 generates an image pyramid of the image by overlapping the detection image and gradually downsized images in a descending order of sizes in a direction from bottom to top. A lowest layer of the image pyramid may be an original image on which the detection is to be performed, and other layers may be images obtained by gradually reducing the size of the detection image. The apparent size in pixels is reduced by reducing the pixels per inch (PPI) gradually to arrive at a substantially identical image, but with less resolution. In other embodiments, the contents of the reduced images differ from the original detection image.

In FIG. 8, an original image scale indicates a size of an original image acquired by the image acquirer 101 and a detector template scale indicates a template size of the target detection apparatus 10. The template size of the target detection apparatus 10 may be the same as a template size of an input layer of a first neural network.

In operation 702, the first classifier 1021 classifies a plurality of candidate areas included in each layer image of an image pyramid based on the first neural network.

The first classifier 1021 scans each layer image included in an image pyramid of a detection image by sliding a template of the input layer of the first neural network.

The first classifier 1021 acquires one image area of the layer image, for example, an image area within a template range, through a template every time that the sliding is performed. An image area of the layer image acquired through the template may be defined as a candidate area. The first classifier 1021 records a corresponding relationship between the plurality of candidate areas and the layer image including the candidate areas.

Neurons in the template of the input layer one-to-one correspond to pixel points of the image area. A form of the template of the input layer is the same as a form of a candidate area. When the template is a matrix of neurons, a corresponding candidate area may be a pixel point matrix.

The first classifier 1021 classifies the candidate areas through a neural network, and classifies the candidate areas into a target candidate area and a non-target candidate area in an output layer. The target candidate area is a candidate area including a target. The non-target candidate area is a candidate area not including the target. The first classifier 1021 acquires a classification result of the candidate areas included in each layer image of the image pyramid. For example, the first classifier 1021 acquires a plurality of target candidate areas and a plurality of non-target candidate areas as a classification result of the first neural network.

In operation 703, the second classifier 1022 classifies areas classified using the first neural network into a plurality of target candidate areas and a plurality of non-target candidate areas based on the plurality of parallel sub-neural networks of the second neural network.

The plurality of parallel sub-neural networks included in the second neural network uses the classification result of the first neural network as an input of a neural network. For example, the plurality of target candidate areas and the plurality of non-target candidate areas classified by the first neural network are used as an input of a parallel sub-neural network of the second neural network.

As described above, the plurality of parallel sub-neural networks corresponds to different target attributes.

Since each of the plurality of parallel sub-neural networks independently operates in parallel, the second classifier 1022 independently receives input information using each of the plurality of parallel sub-neural networks of the second neural network and independently outputs a classification result.

A template size of an input layer of the first neural network is the same as a template size of an input layer of the plurality of parallel sub-neural networks of the second neural network.

The second classifier 1022 classifies the plurality of target candidate areas and the plurality of non-target candidate areas classified by the first neural network using the plurality of parallel sub-neural networks of the second neural network in an asynchronous manner such as crossover, serial, or random.

The second classifier 1022 outputs a classification result from an output layer of each of the sub-neural networks to acquire a classification result of the target candidate areas and the non-target candidate areas.

The second classifier 1022 transmits a selection command with respect to the plurality of parallel sub-neural networks included in the second neural network. When the selection command is received, each of the parallel sub-neural networks performs classification on the classification result of the first neural network.

The second classifier 1022 selectively and adaptively manipulates the sub-neural networks through the selection command, thereby flexibly satisfying various requests of users. Through this, the target detection apparatus 10 may save computing resources of a system in comparison to a case in which a classification is performed by adjusting all sub-neural networks in promiscuous and blind manner. Thus, the target detection apparatus 10 is readily applicable to low-specification hardware or low-performance equipment.

In operation 704, the target area determiner 103 normalizes sizes and positions of the plurality of target candidate areas based on layer images of an image pyramid including the plurality of target candidate areas and differences in size and position between the layer images. Also, the target area determiner 103 acquires a target area by merging the plurality of normalized target candidate areas.

The target area determiner 103 determines a layer image including the plurality of target candidate areas classified by the plurality of parallel sub-neural networks of the second neural network based on a corresponding relationship between the plurality of candidate areas and the layer image including the candidate areas.

The target area determiner 103 normalizes a size and a position of a target candidate area by determining the size and the position of the target candidate area based on a value of a difference in size and a value of a difference in position between the layer image including the target candidate area and layer images of the image pyramid.

For example, the target area determiner 103 normalizes the size and the position of the target candidate area by determining a size and a position of the target candidate area in the detection image based on a value of a difference in size and a value of a difference in position between the detection image, for example, a lowest layer image of the image pyramid and the layer image including the target candidate images.

In operation 705, the target area determiner 103 acquires a target area by merging the plurality of normalized target candidate areas.

With respect to two predetermined target candidate areas obtained through normalization, when a difference in layer between layer images including the two target candidate areas is less than or equal to a preset layer difference value, or when an area-odds ratio of the two target candidate areas is greater than a preset first area-odds ratio value, the target area determiner 103 performs a first merging on the two target candidate areas.

The target area determiner 103 performs the first merging until a plurality of normalized target candidate areas are fully merged.

When the target candidate areas obtained through the normalization are x and y, the target area determiner 103 determines an area intersection and an area union between x and y, and calculates an area-odds ratio between x and y. The area odds-ratio may be, for example, a value obtained by dividing an area of the area intersection by an area of the area union.

When the preset first area-odds ratio value is 0.3, the target area determiner 103 compares the area-odds ratio calculated by the target area determiner 103 to 0.3.

Also, the target area determiner 103 determines levels of layers including x and y in an image pyramid, obtains a layer difference value by calculating a difference between the levels of the layers, and compares the layer difference to 4 corresponding to the preset layer difference value.

When the area-odds ratio between x and y is greater than 0.3 and the layer difference is less than or equal to 4, the target area determiner 103 determines the target candidate areas x and y overlap each other and performs the first merging on the target candidate areas x and y.

Target candidate areas having a small layer difference may have a higher image overlapping probability in comparison to target candidate areas having a large layer difference. Target candidate areas having a large area-odds ratio may have a high merging probability due to a higher image overlapping probability in comparison to target candidate areas having a small area-odds ratio.

In the image pyramid, a layer image of an upper portion is obtained through a size reduction of a layer image in a lower portion. Also, the layer image of the lower portion includes all pixel points or a portion of the pixel points included in the layer image of the upper portion. Thus, the target candidate area having the small layer difference may have a large amount of redundant pixel points. Also, the target candidate areas having the large area-odds ratio may have a large amount of redundant pixel points.

The target area determiner 103 reduces the number of target candidate areas by performing the first merging on overlapping target candidate areas such that the following process is more easily performed. Through this, the target area determiner 103 reduces a loss of image characteristics of the target candidate area after merging in comparison to before merging. Also, the target area determiner 103 increases an efficiency of detection by performing the first merging on the overlapping target candidate areas.

The target area determiner 103 performs the first merging by accumulating sizes and positions of two target candidate areas and obtaining averages thereof. For example, when the target candidate areas are x and y, the target area determiner 103 accumulates and averages coordinates of positions of the target candidate areas x and y, and accumulates and averages lengths and widths of the target candidate areas x and y. In this example, the target area determiner 103 substitutes the accumulated and averaged target candidate areas for the target candidate area x and eliminates the target candidate area y.

The target area determiner 103 performs the first merging by accumulating and averaging two overlapping target candidate areas. The target area determiner 103 merges the two overlapping target candidate areas based on size and position information of target candidate areas before the merging such that pixel points, for example, image characteristics of the two overlapping target candidate areas are integrally included. Through this, the target area determiner 103 reduces the number of target candidate areas while integrally having the image characteristics of the overlapping target candidate areas.

When an area-odds ratio of the two first-merged target candidate areas is greater than a second area-odds ratio value, the target area determiner 103 performs a second merging on the two first-merged target candidate areas. Also, the target area determiner 103 may eliminate a target candidate area having a smaller area between the two first-merged target candidate areas.

The target area determiner 103 performs the merging between the first-merged target candidate area and a second-merged target candidate area, and the merging may be performed at least twice. The target area determiner 103 performs the merging until area-odds ratios between remaining target candidate areas become less than the preset second area-odds ratio.

The target area determiner 103 determines at least one target candidate area among second-merged target candidate areas to be a target area.

For example, the target area determiner 103 determines sizes and an area-odds ratio between x and z, x and z being two first-merged target candidate areas. When a size of x is greater than a size of z and the area-odds ratio between x and z is greater than the second area-odds ratio, 0.4, the target area determiner 103 eliminates z having a smaller size, substitutes a target candidate area for x, thereby completing the second merging.

A relatively large portion of overlapping pixel points may be present between target candidate areas having a great area-odds ratio. In this example, an image overlap rate between the target candidate areas is relatively high. When an area-odds ratio between two target candidate areas is greater than the second area-odds ratio, a larger target candidate area may have more pixel points, more image characteristics, and a higher representativeness in comparison to a smaller target candidate area.

When the second merging is performed to the target candidate areas having a relatively great number of overlapping pixel points, the number of target candidate areas is reduced while most image characteristics are retained. Accordingly, the following process may be more easily performed and a detection efficiency of the target detection apparatus 10 may be significantly increased.

Table 1 shows results of comparison between the target detection apparatus 10 and related arts.

TABLE 1

| Method | Detection rate | Mis-detection | Average speed | Model size |
|---|---|---|---|---|
| AdaBoost | 88% | 500 | 100 msec | 5 MB |
| Cascade CNN | 83% | 500 | 250 msec | 15 MB |
| Other CNN | 96% | 500 | Higher than 500 msec | 100~500 MB |
| Target detection apparatus 10 | 90% | 500 | 200 msec | 1 MB |

Also, Table 1 shows results of detection performed on an FDDB face detection data set. The detection rate of the target detection apparatus 10 is higher than the detection rates obtained based on the AdaBoost algorithm and the cascade CNN algorithm.

The model size is an amount of storage used by a model. When the target detection apparatus 10 performs a model classification using the cascade CNN network, an amount of storage used by a classification model is less than about 1 MB, which is significantly smaller and more suited to limited-resource hardware in comparison to the related arts.

Also, the target detection apparatus 10 is capable of performing the model classification on low-specification hardware and low-performance equipment and thus, may be used even in historically challenging environments.

An average detection rate of the target detection apparatus 10 is higher in comparison to the cascade CNN algorithm. As shown in Table 1, the target detection apparatus 10 saves a detection time of 50 milliseconds (msec) when compared to the cascade CNN algorithm. The target detection apparatus 10 has a relatively high detection rate, a high average detection speed, and a significantly reduced model size.

In Table 1, data may be the result of model classification performed in a device having high-specification hardware and a high computational performance to eliminate an impact of hardware specifications and computational performance.

In the related arts, when the hardware specifications and computational performance of the device are degraded, the detection speed or the detection rate may be reduced due to a large size of the classification model. For example, a Caton system shutdown may occur and a practicality may be lost.

In terms of the target detection apparatus 10, a classification performance change based on a hardware performance change is within a test error range and the detection speed or the detection rate is not reduced. Comparing the detection rates, the detection speeds, and the model sizes comprehensively, the target detection apparatus 10 may provide a detection method optimized for equipment with a low hardware performance.

The target detection apparatus 10 classifies candidate areas using at least two neural networks and a plurality of parallel sub-neural networks, thereby increasing a classification accuracy on a detection image and determining an accurate target area.

By using the parallel sub-neural networks, the target detection apparatus 10 reduces the number of cascaded neural networks and increases a calculation speed. Also, the target detection apparatus 10 significantly reduces an amount of storage used by a classification model so as to be applicable to equipment with a low hardware performance and a low computational performance.

The target detection apparatus 10 matches the parallel sub-neural networks and different target attributes. Through this, an accuracy on identifying a target candidate area and a non-target candidate area is significantly improved and a target detection rate is also increased.

With such improvement of the target detection rate, the target detection apparatus 10 increases the calculation speed using a relatively small number of neural networks and reduces the amount of storage used by the classification model.

The target detection apparatus 10 repetitively performs a fine-tuning on a neural network to gradually increase a detection rate of the neural network and gradually reduce an error rate until a neural network having a highest detection rate and a lowest error rate is determined.

Through the fine-tuning, the target detection apparatus 10 sufficiently realizes a potential performance of the neural network to achieve at least an existing classification model performance of six neural networks by using only two neural networks.

The target detection apparatus 10 reduces the number of neural networks and reduces an amount of storage of a classification model by simplifying a structure of the classification model so as to be applied to equipment with a low hardware performance and a low computational performance, amongst other benefits.

The target detection apparatus 10 increases the target detection rate by merging target candidate areas while preventing a loss of image characteristics in comparison to before the merging.

Figure 9:
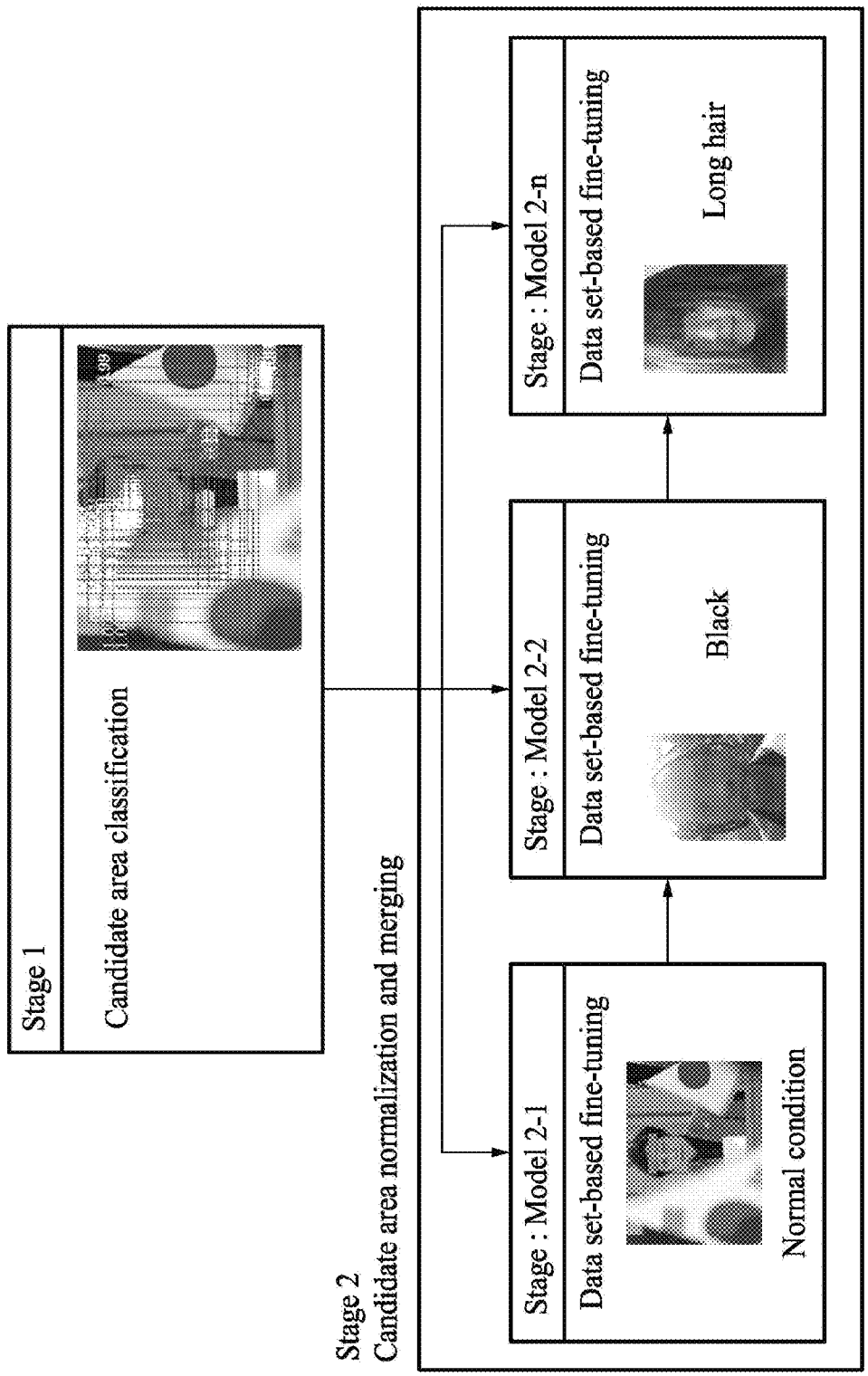
FIG. 9 illustrates an example of an operation of detecting a target using a 2-stage model.

FIG. 9 illustrates an example of an operation of detecting a target using a 2-stage model.

Referring to FIG. 9, the target detection apparatus includes a first stage and a second stage. The first stage is implemented as a first neural network and a second stage is implemented as a second neural network.

The target detection apparatus using the 2-stage model combines leaf models to improve a performance and improve a performance of a shallow deep model.

The first stage classifies a plurality of candidate areas using the first neural network.

The second stage determines a target area using a second neural network.

The second stage refines a classification result of the first stage using a plurality of parallel sub-neural networks and acquires the target area by merging target candidate areas.

The second stage simultaneously performs fine-tuning on the plurality of parallel sub-neural networks. In the example, the second stage performs the fine-tuning using a plurality of datasets.

The target detection apparatus detects a human face using a 2-stage model.

Although the target detection apparatus detects the target using a fewer number of neural networks in comparison to a method of detecting a face using at least three neural networks, an accuracy and a speed of face detection may be relatively high.

The trainer 300 simultaneously trains the first neural network of the first stage and the second neural network of the second stage.

The trainer 300 trains the first neural network and the second neural network in advance, and performs the fine-tuning on the first neural network and the second neural network. The trainer 300 repetitively performs the fine-tuning on the first neural network and the second neural network.

The trainer 300 trains the first neural network to classify candidate areas. The trainer 300 classifies the candidate areas by training the first neural network based on a positive sample and a negative sample. The candidate area classifier

102 outputs a classification result of the first neural network to the second neural network.

The trainer 300 receives information on the negative sample, the positive sample, and a misclassified negative sample from the first neural network and trains the second neural network.

The target area determiner 103 determines a target area using the second neural network trained through the repetitive fine-tuning and detects the target.

The target detection apparatus and components thereof, such as the image acquirer 101, target area determiner 103, candidate area classifier 102, first classifier 1021, second classifier 1022, cascade neural network 104, and trainer 300 in FIGS. 1-9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, oscillators, signal generators, inductors, capacitors, buffers, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by either one or both of analog electrical components, mixed mode components, and computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions, firmware, design model, or software include machine code that is directly executed by the one or more processors or computers, such as machine code produced by a compiler. In another example, the instructions, firmware, analog logic, or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions, firmware, or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

Although specific terminology has been used in this disclosure, it will be apparent after an understanding of the disclosure of this application that different terminology may be used to describe the same features, and such different terminology may appear in other applications.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of detecting a target, the method comprising:
generating an image pyramid based on an image on which a detection is to be performed;
classifying a plurality of candidate areas in the image pyramid using a cascade neural network; and
determining a target area corresponding to a target included in the image based on the plurality of candidate areas,
wherein the cascade neural network comprises a plurality of neural networks, and at least one neural network among the plurality of neural networks comprises a plurality of parallel sub-neural networks.

2. The method of claim 1, wherein the classifying comprises:
classifying a plurality of areas in the image using a first neural network; and
classifying the plurality of areas into a plurality of target candidate areas and a plurality of non-target candidate areas using a second neural network including the plurality of parallel sub-neural networks, and
wherein the plurality of neural networks comprises the first neural network and the second neural network.

3. The method of claim 2, wherein the determining comprises:
normalizing positions and sizes of the plurality of target candidate areas based on layer images of the image pyramid comprising the plurality of target candidate areas and a difference in size and position between the layer images; and
acquiring the target area by merging a plurality of normalized target candidate areas.

4. The method of claim 1, wherein each of the plurality of parallel sub-neural networks corresponds to a different target attribute.

5. The method of claim 4, wherein, in response to the target included in the image being a human face, the target attribute includes any one or any combination of two or more of a front face posture, a side face posture, a front face or a side face by rotation, a skin color, a light condition, an occlusion, and a clarity.

6. The method of claim 1, wherein the plurality of neural networks comprise a convolutional neural network and a Boltzmann network.

7. A non-transitory computer readable storage medium storing instructions that when actuated by a processor, cause the processor to perform the method of claim 1.

8. The method of claim 1, further comprising:
actuating a camera to capture the image on which the detection is to be performed; and,
actuating a processor to generate the image pyramid, classify the plurality of candidate areas; and determine the target area.

9. The method of claim 1, further comprising:
recognizing a human face in the image comprising the target.

10. An apparatus for detecting a target, the apparatus comprising:
an image acquirer configured to generate an image pyramid based on an image on which a detection is to be performed;
a candidate area classifier configured to classify a plurality of candidate areas in the image pyramid using a cascade neural network; and
a target area determiner configured to determine a target area corresponding to a target included in the image based on the plurality of candidate areas,
wherein the cascade neural network comprises a plurality of neural networks, and at least one neural network among the plurality of neural networks comprises a plurality of parallel sub-neural networks.

11. The apparatus of claim 10, wherein the candidate area classifier comprises:
a first classifier configured to classify a plurality of areas in the image using a first neural network; and
a second classifier configured to classify the plurality of areas into a plurality of target candidate areas and a plurality of non-target candidate areas using a second neural network comprising the plurality of parallel sub-neural networks, and
wherein the plurality of neural networks comprises the first neural network and the second neural network.

12. The apparatus of claim 11, wherein the target area classifier is configured to normalize positions and sizes of the plurality of target candidate areas based on layer images of the image pyramid including the plurality of target candidate areas and a difference in size and position between the layer images, and acquire the target area by merging a plurality of normalized target candidate areas.

13. The apparatus of claim 10, wherein each of the plurality of parallel sub-neural networks corresponds to a different target attribute.

14. The apparatus of claim 13, wherein, in response to the target included in the image being a human face, the target attribute includes any one or any combination of two or more of a front face posture, a side face posture, a front face or a side face by rotation, a skin color, a light condition, an occlusion, and a clarity.

15. The apparatus of claim 10, wherein the plurality of neural networks includes a convolutional neural network and a Boltzmann network.

\* \* \* \* \*